United States Patent
Ushijima et al.

(10) Patent No.: US 10,541,416 B2
(45) Date of Patent: Jan. 21, 2020

(54) BINDER FOR LITHIUM ION SECONDARY BATTERY POSITIVE ELECTRODES

(71) Applicant: Sumitomo Seika Chemicals Co., Ltd., Kako-gun, Hyogo (JP)

(72) Inventors: Yasuhito Ushijima, Hyogo (JP); Junichi Fujishige, Hyogo (JP); Shun Hashimoto, Hyogo (JP); Yuji Kinpara, Hyogo (JP)

(73) Assignee: Sumitomo Seika Chemicals Co., Ltd., Kako-gun, Hyogo (JP)

( * ) Notice: Subject to any disclaimer, the term of this patent is extended or adjusted under 35 U.S.C. 154(b) by 13 days.

(21) Appl. No.: 15/742,681

(22) PCT Filed: Jun. 22, 2016

(86) PCT No.: PCT/JP2016/068449
§ 371 (c)(1),
(2) Date: Jan. 8, 2018

(87) PCT Pub. No.: WO2017/006760
PCT Pub. Date: Jan. 12, 2017

(65) Prior Publication Data
US 2018/0205086 A1    Jul. 19, 2018

(30) Foreign Application Priority Data

Jul. 9, 2015  (JP) .................... 2015-137926

(51) Int. Cl.
| | | |
|---|---|---|
| H01B 1/20 | (2006.01) | |
| H01M 4/00 | (2006.01) | |
| H01M 4/62 | (2006.01) | |
| H01M 4/13 | (2010.01) | |
| H01M 4/1397 | (2010.01) | |
| H01M 4/139 | (2010.01) | |
| H01M 4/136 | (2010.01) | |
| H01M 4/58 | (2010.01) | |
| H01M 10/0525 | (2010.01) | |
| H01M 4/02 | (2006.01) | |

(52) U.S. Cl.
CPC .............. *H01M 4/622* (2013.01); *H01B 1/20* (2013.01); *H01M 4/13* (2013.01); *H01M 4/136* (2013.01); *H01M 4/139* (2013.01); *H01M 4/1397* (2013.01); *H01M 4/5825* (2013.01); *H01M 10/0525* (2013.01); *H01M 2004/028* (2013.01); *Y02T 10/7011* (2013.01)

(58) Field of Classification Search
CPC ... H01B 1/00; H01B 1/20; H01B 1/22; H01B 1/24; H01M 4/13; H01M 4/62
See application file for complete search history.

(56) References Cited

U.S. PATENT DOCUMENTS

| | | | | |
|---|---|---|---|---|
| 8,603,682 | B2 * | 12/2013 | Yu ..................... | H01M 10/0565 29/623.5 |
| 2002/0028388 | A1 * | 3/2002 | Lee ........................ | H01B 1/122 429/303 |
| 2008/0206641 | A1 | 8/2008 | Christensen et al. | |
| 2010/0267845 | A1 | 10/2010 | Yoshinaka et al. | |
| 2015/0004448 | A1 * | 1/2015 | Morita .................. | H01M 4/628 429/61 |
| 2015/0137028 | A1 * | 5/2015 | Ichisaka ................ | H01M 4/139 252/182.1 |
| 2016/0156038 | A1 * | 6/2016 | Park ..................... | H01M 4/622 429/217 |

FOREIGN PATENT DOCUMENTS

| | | |
|---|---|---|
| JP | 2008-204829 A | 9/2008 |
| JP | 2010-146871 A | 7/2010 |
| JP | 2012-014920 A | 1/2012 |
| WO | WO 2013/111291 A1 | 8/2013 |
| WO | WO 2015/108109 A1 | 7/2015 |

OTHER PUBLICATIONS

International Search Report in PCT/JP2016/068449, dated Aug. 16, 2016.
Supplementary European Search Report in corresponding European Application No. EP 16 82 1230, dated Nov. 8, 2018.

* cited by examiner

*Primary Examiner* — Mark Kopec
(74) *Attorney, Agent, or Firm* — Knobbe, Martens, Olson & Bear LLP

(57) ABSTRACT

Provided is a binder for lithium ion secondary battery positive electrodes, which is capable of providing a positive electrode for lithium ion secondary batteries with excellent high-rate discharge characteristics. A binder for lithium ion secondary battery positive electrodes, which contains a binder resin and 500 ppm or less of an oil-soluble radical initiator.

9 Claims, No Drawings

BINDER FOR LITHIUM ION SECONDARY BATTERY POSITIVE ELECTRODES

TECHNICAL FIELD

The present invention relates to a binder for lithium ion secondary battery positive electrodes which is capable of imparting excellent high-rate discharge characteristics to a positive electrode for lithium ion secondary batteries, a positive electrode for lithium ion secondary batteries including the binder, and a lithium ion secondary battery provided with the positive electrode.

BACKGROUND ART

In recent years, with the prevalence of mobile electronic equipment such as a notebook personal computer, a smartphone, portable game equipment, and a PDA, in order to make these kinds of equipment lighter in weight and enable the equipment to be used for a long period of time, there has been a demand for attaining reduction in size of a secondary battery used as a power source and highly enhanced energy density thereof.

In particular, there has been an increase in the utilization of a secondary battery as a power source for vehicles such as an electrically-powered car, an electric motorcycle, and an electric vehicle. Such a secondary battery used also as a power source for vehicles is required to operate even over a wide temperature range as well as being required to have highly enhanced energy density.

As the secondary battery, a nickel-cadmium battery, a nickel-hydrogen battery, and the like have hitherto been the mainstream, but there is a tendency for a lithium ion secondary battery to be increasingly used.

Usually, a binder for electrodes (hereinafter, sometimes referred to simply as a binder) is dissolved/dispersed in a solvent/dispersion medium to prepare a binder solution/binder dispersion, the solution/dispersion is mixed with an active material and a conductive additive to prepare mixture slurry for electrodes (hereinafter, sometimes referred to simply as slurry), the slurry is applied onto a current collector, the solvent/dispersion medium is removed by a method such as drying, and the active material, the conductive additive, and the current collector are bound to one another to produce an electrode of the secondary battery.

Although a fluorine-based resin such as polyvinylidene difluoride (PVdF) has hitherto been used as the binder for electrodes, there is a problem that use of an organic solvent causes an increase in the environmental load because the fluorine-based resin is in a state of being dissolved in an organic solvent to be used in a solution state.

As such, there have been proposed binder compositions for lithium ion secondary batteries such as carboxymethyl cellulose (CMC) and a styrene-butadiene rubber latex (SBR) and a crosslinked compound of polyacrylic acid substituted with an alkali cation and polyvinyl alcohol, which can be dissolved or dispersed in water, are inexpensive, and give little environmental loads (Patent Document 1 and Patent Document 2).

PRIOR ART DOCUMENTS

Patent Documents

Patent Document 1: Japanese Patent Laid-open Publication No. 2010-146871

Patent Document 2: Japanese Patent Laid-open Publication No. 2008-204829

SUMMARY OF THE INVENTION

Problems to be Solved by the Invention

However, the present inventors conducted studies, whereupon they found out that there are cases where the electrode is made larger in internal resistance, for example, in the case where the binder composition for lithium ion secondary batteries disclosed in Patent Document 1 or Patent Document 2 is used and the like.

The present inventors conducted further studies, whereupon they found out that an oil-soluble radical initiator, which was used in producing a binder resin contained in a binder composition by polymerization, remains in the binder composition, the oil-soluble radical initiator or a by-product produced when an oil-soluble radical initiator reacts with an electrolytic solution or the like causes a rise in internal resistance, and this causes high-rate discharge characteristics of a battery to be deteriorated.

Under such circumstances, a main object of the present invention is to provide a binder for lithium ion secondary battery positive electrodes which is capable of suppressing a rise in internal resistance of a lithium ion secondary battery and imparting excellent high-rate discharge characteristics, a positive electrode prepared with the binder, a lithium ion secondary battery prepared with the positive electrode, and electrical equipment mounted with the lithium ion secondary battery.

Means for Solving the Problem

The present inventors made earnest investigations in order to solve the above-mentioned problems. As a result, the present inventors found out that, by setting the content of the oil-soluble radical initiator in a binder for lithium ion secondary battery positive electrodes to a prescribed value or less, the electrode is made smaller in internal resistance and a lithium ion secondary battery excellent in high-rate discharge characteristics can be obtained, and thus, the present invention has been completed. That is, the present invention provides the following embodiments.

Aspect 1.

A binder for lithium ion secondary battery positive electrodes including a binder resin and an oil-soluble radical initiator in a concentration of 500 ppm or less.

Aspect 2.

The binder for lithium ion secondary battery positive electrodes described in Aspect 1, wherein the oil-soluble radical initiator is at least one kind selected from the group consisting of an organic peroxide, an azo compound, and a redox initiator.

Aspect 3.

The binder for lithium ion secondary battery positive electrodes described in Aspect 1 or 2, wherein the binder resin is a suspension polymer, an emulsion polymer, a dispersion polymer, or a precipitation polymer constituted of monomer units.

Aspect 4.

The binder for lithium ion secondary battery positive electrodes described in any one of Aspects 1 to 3, wherein the binder resin contains at least one kind selected from the group consisting of poly(meth)acrylic acid, polyoxyethylene, polyvinyl alcohol, a styrene-butadiene rubber latex, polyacrylonitrile, polyethylene, polypropylene, polybutadiene, polytetrafluoroethylene, an ethylene-vinyl acetate copolymer, an interpolymer constituted of ethylenically unsaturated carboxylic acid-alkali metal neutralized product units and vinyl alcohol units, and an alkyl-modified carboxyl group-containing interpolymer.

Aspect 5.

The binder for lithium ion secondary battery positive electrodes described in Aspect 4, wherein the alkyl-modified carboxyl group-containing interpolymer is prepared by copolymerizing a (meth)acrylic acid alkyl ester having an alkyl group with 18 to 24 carbon atoms in a proportion of 0.1 to 10 parts by mass with 100 parts by mass of (meth)acrylic acid.

Aspect 6.

A positive electrode for lithium ion secondary batteries including an active material, a conductive additive, and the binder for lithium ion secondary battery positive electrodes described in any one of Aspects 1 to 5.

Aspect 7.

The positive electrode for lithium ion secondary batteries described in Aspect 6, wherein the binder in an amount of 0.5 to 30% by mass relative to the total mass of the active material, the conductive additive, and the binder is included.

Aspect 8.

A lithium ion secondary battery being provided with the positive electrode for lithium ion secondary batteries described in Aspect 6 or 7.

Aspect 9.

Electrical equipment being mounted with the lithium ion secondary battery described in Aspect 8.

Aspect 10.

A use of a composition including a binder resin and an oil-soluble radical initiator in a concentration of 500 ppm or less for a binder for lithium ion secondary battery positive electrodes.

Aspect 11.

A method of producing a binder for lithium ion secondary battery positive electrodes including the step of mixing a binder resin and an oil-soluble radical initiator in a concentration of 500 ppm or less.

Advantages of the Invention

According to the present invention, the content of the oil-soluble radical initiator in a binder for lithium ion secondary battery positive electrodes is set to a prescribed value or less. On this account, the binder for lithium ion secondary battery positive electrodes of the present invention can make the electrode smaller in internal resistance and can impart excellent high-rate discharge characteristics to a lithium ion secondary battery. Furthermore, according to the present invention, there can be provided a positive electrode for lithium ion secondary batteries prepared with the binder, a lithium ion secondary battery prepared with the positive electrode, and electrical equipment mounted with the lithium ion secondary battery. The lithium ion secondary battery according to the present invention has excellent high-rate discharge characteristics as compared with a conventional lithium ion secondary battery, both the technical advancement in function of a battery and the cost reduction thereof can be achieved, and the range of usage applications can be enlarged.

EMBODIMENTS OF THE INVENTION

Hereinafter, the binder for lithium ion secondary battery positive electrodes of the present invention, a positive electrode for lithium ion secondary batteries prepared with the binder, a lithium ion secondary battery prepared with the positive electrode, and electrical equipment mounted with the lithium ion secondary battery will be described in detail.

<Binder for Lithium Ion Secondary Battery Positive Electrodes>

The binder for lithium ion secondary battery positive electrodes of the present invention is characterized as including a binder resin and an oil-soluble radical initiator in a concentration of 500 ppm or less.

In the binder for lithium ion secondary battery positive electrodes of the present invention, the oil-soluble radical initiator is an initiator that should be used for producing a binder resin by a free radical polymerization of monomers. Although the oil-soluble radical initiator is not particularly restricted, preferred examples thereof include an organic peroxide, an azo compound, a redox initiator, and the like. One kind of the oil-soluble radical initiator may be used alone and two or more kinds thereof may be used in combination. In this connection, in the present invention, even in the case where two or more kinds of the oil-soluble radical initiator are included in a binder, the content of the oil-soluble radical initiator in the binder is 500 ppm or less.

Specific examples of the oil-soluble radical initiator include $\alpha,\alpha'$-azoisobutyronitrile, 2,2'-azobis-2,4-dimethylvaleronitrile, 2,2'-azobismethyl isobutylate, benzoyl peroxide, lauroyl peroxide, cumene hydroperoxide, tertiary butyl hydroperoxide, and the like. Above all, from the viewpoints of ease of handling and being excellent in stability, $\alpha,\alpha'$-azoisobutyronitrile is preferred.

The binder resin is a free radical polymer constituted of monomer units and is produced by a free radical polymerization using the oil-soluble radical initiator described above. Specific examples of the binder resin include a suspension polymer constituted of monomer units, an emulsion polymer constituted thereof, a dispersion polymer constituted thereof, a precipitation polymer constituted thereof, and the like.

Examples of the binder resin include poly(meth)acrylic acid, polyoxyethylene, polyvinyl alcohol, a styrene-butadiene rubber latex, polyacrylonitrile, polyethylene, polypropylene, polybutadiene, polytetrafluoroethylene, an ethylene-vinyl acetate copolymer, an interpolymer constituted of ethylenically unsaturated carboxylic acid-alkali metal neutralized product units and vinyl alcohol units, an alkyl-modified carboxyl group-containing interpolymer, and the like. Of these, from the viewpoints of easy availability of the material, the binding property attributed to the affinity with a conductive additive, and the like, an alkyl-modified carboxyl group-containing interpolymer is preferably used. One kind of the binder resin may be used alone and two or more kinds thereof may be used in combination.

Hereinafter, the alkyl-modified carboxyl group-containing interpolymer which is suitable as the binder resin in the present invention will be described in detail. In the present invention, it is preferred that the alkyl-modified carboxyl group-containing interpolymer be prepared by copolymerizing a (meth)acrylic acid alkyl ester having an alkyl group with 18 to 24 carbon atoms in a proportion of 0.1 to 10 parts by mass or so with 100 parts by mass of (meth)acrylic acid. In this connection, in the present invention, "(meth)acrylic acid" refers to a general term for "acrylic acid and methacrylic acid" and the same holds true for the case similar to this.

In the present invention, examples of the (meth)acrylic acid include acrylic acid, β-methylacrylic acid, methacrylic acid, and the like, and acrylic acid and methacrylic acid are suitably used. One kind of the (meth)acrylic acid may be used alone and two or more kinds thereof may be used in combination.

In the present invention, the (meth)acrylic acid alkyl ester having an alkyl group with 18 to 24 carbon atoms refers to an ester of (meth)acrylic acid with a higher alcohol having an alkyl group with 18 to 24 carbon atoms, and examples thereof include stearyl acrylate, eicosanyl acrylate, behenyl acrylate, tetracosanyl acrylate, stearyl methacrylate, eicosanyl methacrylate, behenyl methacrylate, tetracosanyl methacrylate, and the like. Of these, from the viewpoints of being inexpensive and easily available and excellent coating properties of a binder composed of the resulting interpolymer and the viewpoint of binding strength, stearyl (meth)acrylate, eicosanyl (meth)acrylate, behenyl (meth)acrylate, and tetracosanyl (meth)acrylate are suitably used. In this connection, as the (meth)acrylic acid alkyl ester having an alkyl group with 18 to 24 carbon atoms, for example, a commercial product such as BLEMMER VMA70 (trade name) available from NOF CORPORATION may be used. One kind of the (meth)acrylic acid alkyl ester having an alkyl group with 18 to 24 carbon atoms may be used alone and two or more kinds thereof may be used in combination.

In the present invention, with regard to the combination of (meth)acrylic acid and a (meth)acrylic acid alkyl ester having an alkyl group with 18 to 24 carbon atoms which constitute an alkyl-modified carboxyl group-containing interpolymer, one kind of the (meth)acrylic acid and one kind of the (meth)acrylic acid alkyl ester may be combined, two or more kinds of one of the (meth)acrylic acid and the (meth)acrylic acid alkyl ester may be used to be combined with one kind of the other thereof, and two or more kinds of one of the (meth)acrylic acid and the (meth)acrylic acid alkyl ester may be used to be combined with two or more kinds of the other thereof.

In the binder for lithium ion secondary battery positive electrodes of the present invention, although the proportion of the (meth)acrylic acid alkyl ester having an alkyl group with 18 to 24 carbon atoms is not particularly limited, from the viewpoints of preventing peeling of a mixture for electrodes and elimination of an active material from the current collector and imparting excellent binding durability against repeated charging and discharging, the proportion thereof is preferably 0.1 to 10 parts by mass or so and more preferably 0.1 to 5 parts by mass or so relative to 100 parts by mass of (meth)acrylic acid. When the proportion of the (meth)acrylic acid alkyl ester having an alkyl group with 18 to 24 carbon atoms is less than 0.1 parts by mass relative to 100 parts by mass of (meth)acrylic acid, there is a case where the binding capacity of a binder becomes insufficient because the hydrophobic interaction by the alkyl group becomes weak. On the other hand, when being more than 10 parts by mass, there is a case where an alkyl-modified carboxyl group-containing interpolymer becomes difficult to be uniformly dispersed in a liquid medium such as water described below because the hydrophobicity becomes strong.

In the present invention, in addition to the (meth)acrylic acid and the (meth)acrylic acid alkyl ester having an alkyl group with 18 to 24 carbon atoms, a compound having two or more ethylenically unsaturated groups may be further copolymerized therewith. Although the compound having two or more ethylenically unsaturated groups is not particularly restricted, from the viewpoints of preventing peeling of a mixture for electrodes and elimination of an active material from the current collector and imparting excellent binding durability against repeated charging and discharging, a compound with an allyl group as the ethylenically unsaturated group is preferred. Furthermore, of these, from the viewpoint of enhancing the binding property with an active material, a conductive additive such as carbon fiber, and a current collector made of aluminum, copper, or the like, pentaerythritol allyl ethers such as pentaerythritol diallyl ether, pentaerythritol triallyl ether, and pentaerythritol tetraallyl ether, diethylene glycol diallyl ether, polyethylene glycol diallyl ether, polyallylsaccharose, and the like are further preferred. In this connection, these compounds having two or more ethylenically unsaturated groups may be used alone and two or more kinds thereof may be used in combination.

In the present invention, in the case of using a compound having two or more ethylenically unsaturated groups, the proportion thereof is preferably 0.5 parts by mass or less, more preferably 0.001 to 0.5 parts by mass or so, and further preferably 0.01 to 0.2 parts by mass or so relative to 100 parts by mass of (meth)acrylic acid. When the proportion of the compound having two or more ethylenically unsaturated groups is 0.5 parts by mass or less, slurry containing a binder becomes homogeneous and there is no fear that the battery performance is lowered.

Although the weight average molecular weight of an alkyl-modified carboxyl group-containing interpolymer included in the binder of the present invention is not particularly restricted, for example, the weight average molecular weight thereof is 10000 to 10000000 or so. In this connection, the weight average molecular weight refers to a value obtained by being measured by gel permeation chromatography (GPC) using the standard polystyrene.

In the present invention, a method of making (meth)acrylic acid, a (meth)acrylic acid alkyl ester having an alkyl group with 18 to 24 carbon atoms, and a compound having two or more ethylenically unsaturated groups used as necessary undergo a copolymerization to obtain an alkyl-modified carboxyl group-containing interpolymer is not particularly limited, and a usual method such as a method of stirring these raw materials in a solvent under an inert gas atmosphere to be made to undergo a polymerization with the use of an oil-soluble radical initiator can be used. The polymerization method is not particularly restricted, usual polymerization methods such as emulsion polymerization, suspension polymerization, dispersion polymerization, solution polymerization, and precipitation polymerization can be adopted, and emulsion polymerization, suspension polymerization, dispersion polymerization, and precipitation polymerization can be preferably adopted. Examples of the inert gas include nitrogen gas, argon gas, and the like.

Moreover, a solvent used in the copolymerization is not particularly limited as long as the solvent is one that dissolves (meth)acrylic acid, a (meth)acrylic acid alkyl ester having an alkyl group with 18 to 24 carbon atoms, and a compound having two or more ethylenically unsaturated groups used as necessary but does not dissolve an alkyl-modified carboxyl group-containing interpolymer produced by the copolymerization and is one that does not inhibit the reaction. Specific examples of the solvent include chain hydrocarbons such as normal pentane, normal hexane, isohexane, normal heptane, normal octane, and isooctane; alicyclic hydrocarbons such as cyclopentane, methylcyclopentane, cyclohexane, and methylcyclohexane; aromatic hydrocarbons such as benzene, toluene, xylene, and chlorobenzene; halogenated hydrocarbons such as ethylene dichloride; esters such as ethyl acetate and isopropyl acetate; ketones such as methyl ethyl ketone and methyl isobutyl ketone, and the like. One kind of the solvent may be used alone and two or more kinds thereof may be used in combination.

The oil-soluble radical initiator used for copolymerization is not particularly limited as long as the initiator is a oil-soluble radical initiator that can be made soluble in oil. Examples thereof include α,α'-azoisobutyronitrile, 2,2'-azobis-2,4-dimethylvaleronitrile, 2,2'-azobismethyl isobutylate, benzoyl peroxide, lauroyl peroxide, cumene hydroperoxide, tertiary butyl hydroperoxide, and the like. Above all, from the viewpoints of ease of handling and being excellent in stability, α,α'-azoisobutyronitrile is preferred.

Although the amount of an oil-soluble radical initiator used is not particularly restricted, for example, it is desirable that the amount thereof be 0.00003 to 0.002 moles or so relative to 1 mole of (meth)acrylic acid. In the case where the amount of an oil-soluble radical initiator used is less than 0.00003 moles, there is a case where the process becomes uneconomical because the reaction rate becomes slow. Moreover, in the case where the amount of an oil-soluble radical initiator used is more than 0.002 moles, there is a case where heat removal becomes difficult because the polymerization proceeds rapidly and vigorously and the reaction becomes difficult to be controlled.

The concentration of an oil-soluble radical initiator (residual initiator) remaining in the binder for lithium ion secondary battery positive electrodes of the present invention is 500 ppm or less, preferably 300 ppm or less, and further preferably 200 ppm or less. That is, the proportion of an oil-soluble radical initiator included in the binder to a binder resin included in the binder is 500 ppm or less or so in terms of the mass ratio. By making the remaining amount of the initiator 500 ppm or less, a rise in internal resistance of a battery can be suppressed and the high-rate discharge characteristics of the battery can be enhanced.

A method of reducing the residual initiator is not particularly restricted, examples thereof include a method of reducing the amount of an oil-soluble radical initiator used, a method of excessively heating, a method of adding a reaction terminator, a method of washing with a solvent compatible with an oil-soluble radical initiator, and the like, and preferred is a method of washing with a solvent compatible with an oil-soluble radical initiator described below. Moreover, one of these methods may be carried out and two or more methods thereof may be combined to be carried out.

Although the reaction temperature is not particularly restricted, the reaction temperature is preferably 50 to 90° C. or so and more preferably 55 to 75° C. or so. In the case where the reaction temperature is less than 50° C., there is a case where the viscosity of a reaction solution is increased and the reaction solution fails to be uniformly stirred. Moreover, in the case where the reaction temperature is more than 90° C., the reaction proceeds rapidly and vigorously and the reaction fails to be controlled. Although the reaction time cannot be decided sweepingly since the period of time varies depending on the reaction temperature, the reaction time is usually 0.5 to 5 hours or so.

After the completion of the reaction, centrifugal filtration is performed to remove the filtrate, a fresh solvent is added again to the solid matter to be stirred, and centrifugal filtration is performed to remove the filtrate. With this setup, the residual initiator contained in a resin can be reduced.

For example, a reaction solution can be heated to 80 to 130° C. or so and the solvent can be distilled off to obtain an alkyl-modified carboxyl group-containing interpolymer. In the case where the heating temperature is less than 80° C., there is a case where a long period of time is required for drying. Moreover, in the case where the heating temperature is more than 130° C., there is a case where the solubility of the resulting alkyl-modified carboxyl group-containing interpolymer to a liquid medium such as water is deteriorated.

Although the volume average particle diameter of the alkyl-modified carboxyl group-containing interpolymer thus obtained is not particularly restricted, the volume average particle diameter thereof is preferably 0.1 to 50 μm or so, more preferably 0.5 to 30 μm or so, and further preferably 1 to 20 μm or so. When the volume average particle diameter is less than 0.1 μm, the amount of the binder required for sufficiently binding the active material in the electrode is increased, and as a result, there is a case where the rate characteristics are lowered because the surface of the active material is covered with the binder. Conversely, when the volume average particle diameter of the interpolymer is more than 50 μm, there is a possibility that the resistance becomes large because the conductive additive is ununiformly dispersed. In this connection, these particles can be aggregated by the addition of water or the like, and in this case, the volume average particle diameter may lie within the range of 100 to 1000 μm. In this connection, the volume average particle diameter of the alkyl-modified carboxyl group-containing interpolymer refers to a value obtained by being measured by using normal hexane as a dispersant with the use of a laser diffraction type particle size distribution measuring apparatus (SALD-7100 available from SHIMADZU CORPORATION).

In the case where a binder composed of an alkyl-modified carboxyl group-containing interpolymer of the present invention is used in an electrode, the binder is usually dissolved or dispersed in a liquid medium such as water described below to be used.

<Positive Electrode>

As mentioned above, by using the binder for lithium ion secondary battery positive electrodes of the present invention in a positive electrode, excellent high-rate discharge characteristics can be imparted to a positive electrode for lithium ion secondary batteries.

For example, a positive electrode in the present invention is produced in the following manner. A positive electrode active material, a conductive additive, a binder of the present invention, and a liquid medium such as water are mixed to prepare pasty slurry as a positive electrode mixture. The positive electrode mixture can be applied onto a positive electrode current collector to prepare a binder for lithium ion secondary battery positive electrodes of the present invention. A binder of the present invention may be previously dissolved in a liquid medium to be used or a powdery binder of the present invention and a positive electrode active material are previously mixed, after which the mixture may be added with a liquid medium to be used.

(Positive Electrode Active Material)

The positive electrode active material is not particularly restricted and a known positive electrode active material used in a lithium ion secondary battery can be used. Specific examples of the positive electrode active material include lithium iron phosphate ($LiFePO_4$), lithium manganese phosphate ($LiMnPO_4$), lithium cobalt phosphate ($LiCoPO_4$), lithium iron pyrophosphate ($Li_2FeP_2O_7$), lithium cobalt composite oxide ($LiCoO_2$), spinel type lithium manganese composite oxide ($LiMn_2O_4$), lithium manganese composite oxide ($LiMnO_2$), lithium nickel composite oxide ($LiNiO_2$), lithium niobium composite oxide ($LiNbO_2$), lithium iron composite oxide ($LiFeO_2$), lithium magnesium composite oxide ($LiMgO_2$), lithium calcium composite oxide (Li- CaO$_2$), lithium copper composite oxide (LiCuO$_2$), lithium zinc composite oxide (LiZnO$_2$), lithium molybdenum composite oxide (LiMoO$_2$), lithium tantalum composite oxide (LiTaO$_2$), lithium tungsten composite oxide (LiWO$_2$), lithium-nickel-cobalt-aluminum composite oxide (LiNi$_{0.8}$Co$_{0.15}$Al$_{0.05}$O$_2$), lithium-nickel-cobalt-manganese composite oxide (LiNi$_{0.33}$Co$_{0.33}$Mn$_{0.33}$O$_2$), a lithium-rich ternary nickel-cobalt-manganese composite oxide, manganese oxide-nickel (LiNi$_{0.5}$Mn$_{1.5}$O$_4$), manganese oxide (MnO$_2$), a vanadium-based oxide, a sulfur-based oxide, a silicate-based oxide, and the like. One kind of the positive electrode active material may be used alone and two or more kinds thereof may be used in combination.

(Conductive Additive)

Although the conductive additive is not particularly restricted as long as the additive has a conductivity, carbon powder is preferred. Examples of the carbon powder include ones usually used, namely, carbon materials such as acetylene black (AB), Ketjen black (KB), graphite, carbon fibers, carbon tubes, graphene, amorphous carbon, hard carbon, soft carbon, glassy carbon, carbon nanofibers, and carbon nanotubes. One kind of the conductive additive may be used alone and two or more kinds thereof may be used in combination.

As the conductive additive, of these, from the viewpoint of enhancement in conductivity, carbon nanofibers and carbon nanotubes are preferred and carbon nanotubes are more preferred. In the case where carbon nanotubes are used as the conductive additive, although the amount of the nanotubes used is not particularly restricted, for example, the nanotubes in an amount of preferably 30 to 100% by mass or so, more preferably 40 to 100% by mass or so, are used relative to the whole conductive additive. When the amount of the carbon nanotubes used is less than 30% by mass, there is a case where a sufficient conductive pathway is not secured between a positive electrode active material and a positive electrode current collector, and in particular, a sufficient conductive pathway fails to be formed at the time of high-speed charging and discharging. In this connection, a carbon nanofiber refers to a fibrous material with a thickness of several nm to several hundreds of nm, and in particular, a fibrous material having a hollow structure is referred to as a carbon nanotube. There are various kinds of carbon nanotubes such as a single-walled carbon nanotube and a multi-walled carbon nanotube. Although these are produced by various methods such as a vapor phase growth method, an arc-discharge method, and a laser evaporation method, the production method is not particularly restricted.

Although the amount of the conductive additive used in a positive electrode is not particularly restricted, for example, in the case where the total of the positive electrode active material, the conductive additive, and the binder is defined as 100% by mass, the conductive additive in an amount of preferably 1.5 to 20% by mass or so, more preferably 2.0 to 10% by mass or so, is used. In this connection, when the amount of the conductive additive used is less than 1.5% by mass, there is a case where the conductivity of a positive electrode fails to be sufficiently enhanced. Moreover, when the amount of the conductive additive used is more than 20% by mass, the positive electrode is not preferred in the point that high capacity is hardly attained at the time of charging and discharging of a battery because the proportion of the positive electrode active material is relatively reduced, aggregation of the positive electrode active material is caused because carbon powder as the conductive additive repels water and becomes difficult to be uniformly dispersed in the case of using water as the liquid medium, and the amount of a binder used is increased because the conductive additive is small and has a large surface area as compared with the positive electrode active material, and the like.

Although the amount of the binder of the present invention used in a positive electrode is not particularly restricted, for example, in the case where the total of the positive electrode active material, the conductive additive, and the binder is defined as 100% by mass, the binder in an amount of preferably 0.5% by mass or more and 30% by mass or less, more preferably 1% by mass or more and 20% by mass or less and further preferably 2% by mass or more and 8% by mass or less, is used. When the amount of the binder is too large, there is a case where a positive electrode is made larger in resistance inside the electrode and deterioration in high-rate discharge characteristics is caused. Moreover, when the amount of the binder is too small, there is a case where charge-discharge cycle characteristics are lowered.

(Liquid Medium)

Examples of the liquid medium include water and a non-aqueous medium. As the non-aqueous medium, aliphatic hydrocarbons such as n-octane, isooctane, nonane, decane, decalin, pinene, and chlorododecane; cycloaliphatic hydrocarbons such as cyclopentane, cyclohexane, cycloheptane, and methylcyclopentane; aromatic hydrocarbons such as styrene, chlorobenzene, chlorotoluene, ethylbenzene, diisopropylbenzene, and cumene; alcohols such as methanol, ethanol, propanol, isopropanol, butanol, benzyl alcohol, and glycerine; ketones such as acetone, methyl ethyl ketone, cyclopentanone, and isophorone; ethers such as methyl ethyl ether, diethyl ether, tetrahydrofuran, and dioxane; lactones such as γ-butyrolactone and δ-butyrolactone; lactams such as β-lactam; chain/cyclic amides such as dimethylformamide, N-methylpyrrolidone, and dimethylacetamide; nitrile group-containing compounds such as methylene cyanohydrin, ethylene cyanohydrin, 3,3'-thiodipropionitrile, and acetonitrile; nitrogen-containing heterocyclic compounds such as pyridine and pyrrole; glycols such as ethylene glycol and propylene glycol; diethylene glycols such as diethylene glycol, diethylene glycol monoethyl ether, and diethylene glycol ethyl butyl ether; esters such as ethyl formate, ethyl lactate, propyl lactate, methyl benzoate, methyl acetate, and methyl acrylate, and the like are exemplified. Moreover, as the non-aqueous medium, mixtures such as lacquer, gasoline, naphtha, and kerosene can be used. Of the above-mentioned liquid mediums, water is preferred from the viewpoints of solubility and economy and it is preferred that, with the use of an alkaline component such as sodium hydroxide, the pH of a solution be adjusted to 6 to 8 to be used.

In the case where a binder containing an alkyl-modified carboxyl group-containing interpolymer of the present invention is dissolved or dispersed in a liquid medium to be used, the content of the interpolymer in the whole dissolving liquid or dispersing liquid is preferably 0.2 to 70% by mass or so, more preferably 0.5 to 60% by mass or so, further preferably 0.5 to 50% by mass or so, and especially preferably 2 to 35% by mass or so.

The pH of the slurry is preferably 4 to 10, more preferably 5 to 9, and further preferably 6 to 8. When the pH becomes 4 or less, there is a fear that battery performance is lowered due to the corrosion of a positive electrode current collector and the degradation of an electrolytic solution or a positive electrode active material. Moreover, when the pH becomes 10 or more, there is a fear that battery performance is lowered because a positive electrode current collector constituted of metal such as aluminum is corroded.

For the purpose of adjusting the pH of slurry, a pH adjusting agent may be used. Examples of the pH adjusting agent include an acidic pH adjuster and an alkaline pH adjuster. Examples of the acidic pH adjuster include inorganic acids such as hydrochloric acid, sulfuric acid, phosphoric acid, and nitric acid; and organic acids such as formic acid, acetic acid, propionic acid, and citric acid. Moreover, examples of the alkaline pH adjuster include inorganic alkalis such as sodium hydroxide, potassium hydroxide, and lithium hydroxide; organic alkalis such as ammonia, methylamine, and ethylamine, and the like.

Moreover, in the present invention, in order to enhance the coating properties of slurry and enhance the charge-discharge characteristics, an additive may be used. Examples of the additive include cellulose-based polymers such as carboxymethyl cellulose, methyl cellulose, and hydroxypropyl cellulose, polyacrylates such as sodium polyacrylate, polyvinyl alcohol, polyethylene oxide, polyvinyl pyrrolidone, a (meth)acrylic acid-vinyl alcohol copolymer, a maleic acid-vinyl alcohol copolymer, a modified polyvinyl alcohol, polyethylene glycol, an ethylene-vinyl alcohol copolymer, a polyvinyl acetate partially ketonized product, and the like. One kind of the additive may be used alone and two or more kinds thereof may be used in combination.

Although the proportion of these additives used is not particularly restricted, the proportion thereof is preferably less than 300 parts by mass, more preferably 30 parts by mass or more and 250 parts by mass or less, and further preferably 40 parts by mass or more and 200 parts by mass or less relative to 100 parts by mass of an alkyl-modified carboxyl group-containing interpolymer constituting the binder. When the proportion thereof lies within such a range, an electrode excellent in smoothness can be obtained. In this connection, such an additive may be added to a binder to be used and may be added to the above-mentioned slurry to be used.

In this connection, in a positive electrode, without impairing the object of the present invention, water-soluble compounds such as acrylic acid, an acrylic acid metal neutralized salt, methacrylic acid, a methacrylic acid metal neutralized salt, carboxymethyl cellulose, and hydroxyethyl cellulose and conventional binders such as styrene/butadiene copolymer-containing emulsion, butadiene/acrylonitrile copolymer-containing emulsion, PVdF-containing emulsion, and polytetrafluoroethane polymer-containing emulsion may be used together with the binder of the present invention.

(Positive Electrode Current Collector)

The material for the positive electrode current collector is not particularly restricted as long as the material has an electron conductivity and can make a current pass through a positive electrode material provided thereon. Examples of the material for the positive electrode current collector include conductive substances made of C, Ti, Cr, Mo, Ru, Rh, Ta, W, Os, Ir, Pt, Au, Al, and the like, an alloy containing two or more kinds of these conductive substances (for example, stainless steel), and the like. From the viewpoints of being high in electrical conductivity and being satisfactory in stability in an electrolytic solution and oxidation resistance, as the material for the positive electrode current collector, C, Al, stainless steel, and the like are preferred, and from the viewpoint of material costs, Al or the like is further preferred.

The shape of the positive electrode current collector is not particularly restricted and examples thereof include a foil-like shape, a three-dimensional shape, and the like. In this connection, even in the case of a binder being low in adhesion to a positive electrode current collector, when the positive electrode current collector has a three-dimensional shape (sponged metal, mesh, woven fabric, nonwoven fabric, expanded shape, or the like), an electrode with a high capacity density is obtained and high-rate charge and discharge characteristics thereof also become satisfactory.

In this connection, even in the case of a foil-shaped positive electrode current collector, a primer layer can be previously formed on the current collector surface to attain highly enhanced capacity. As the primer layer, ones that are satisfactory in adhesion to a positive electrode active material layer and a positive electrode current collector and have a conductivity can be used. For example, a binder with which a carbon-based conductive additive is mixed can be applied onto a positive electrode current collector so that the coating layer has a thickness of 0.1 μm to 50 μm to be formed into a primer layer.

As a conductive additive used for the primer layer, carbon powder is preferred. When a metal-based conductive additive is adopted, the capacity density can be heightened, but there is a case where the input-output characteristics become poor. When a carbon-based one is adopted as the conductive additive, the input-output characteristics become easy to be enhanced. Examples of the carbon-based conductive additive include KB, AB, VGCF, graphite, graphene, carbon tubes, and the like. One kind of the conductive additive may be used alone and two or more kinds thereof may be used in combination. As the conductive additive used for the primer layer, from the viewpoints of conductivity and costs, KB or AB is preferred.

As a binder used for the primer layer, any kind of binder is acceptable as long as the binder can bind the carbon-based conductive additive. However, when the binder of the present invention or a water-based binder such as PVA, CMC, or sodium alginate is used to form a primer layer, there is a case where the primer layer is dissolved at the time of forming an active material layer and effects are not exerted significantly. On that account, at the time of using such a water-based binder, it is good for the primer layer to be previously crosslinked. Examples of a crosslinking material include a zirconia compound, a boron compound, a titanium compound, and the like and it is good for the crosslinking material in an amount of 0.1 to 20% by mass or so relative to the amount of the binder to be added to slurry to be formed into a primer layer. By virtue of the primer layer thus prepared, in a foil-shaped positive electrode current collector, the capacity density can be enhanced with the use of a water-based binder. Furthermore, high-rate charge and discharge characteristics become satisfactory because polarization is made small even when charging and discharging are performed under a high current condition. In this connection, the primer layer creates the above-mentioned effect in the case of a foil-shaped positive electrode current collector. The same holds true for the case of a three-dimensionally shaped positive electrode current collector.

For example, a positive electrode for the lithium ion secondary battery of the present invention may be a positive electrode for lithium ion secondary batteries in which a positive electrode active material provided with a metal oxide represented by the following Composition Formula 1 on its active material particle surface and the binder of the present invention are used.

  Composition Formula 1

In Composition Formula 1, M represents at least one kind of metal element selected from the group consisting of Al, Ti, Cr, Mn, Fe, Co, Ni, Cu, Zr, Nb, Mo, Ag, Ta, W, and Ir, and α, β, and γ satisfy the equations of $0 \leq \alpha \leq 6$, $1 \leq \beta \leq 5$, and $0 < \gamma \leq 12$, respectively. Among these, from the viewpoint of heat resistance, it is preferred that M represent Zr.

In this connection, in the present specification, "a positive electrode active material provided with a metal oxide on its active material particle surface" refers to a concept that includes a positive electrode provided with an overcoat layer constituted of a metal oxide on its electrode surface, a positive electrode active material covered with a metal oxide on its particle surface, and using both of the positive electrode and the positive electrode active material in combination.

By providing the active material particle surface of a positive electrode active material with a metal oxide, matters of concern at the time of using a water-based binder like the present invention, namely, lowering in capacity of the positive electrode active material caused by elution of lithium from the positive electrode active material and oxidative decomposition of the water-based binder at the time of charging can be prevented and the high-rate discharge characteristics can be further enhanced.

Furthermore, by providing the active material particle surface with a metal oxide, such a positive electrode active material having an operating voltage of more than 4 V can be used in a conventional electrolytic solution. For example, although there is a fear that electrons are taken out from an electrolytic solution and oxidative decomposition is caused because the redox potential attributed to a valence change from divalent one to tetravalent one or from tetravalent one to divalent one of a phosphoric acid transition metal lithium compound, in which the transition metal is constituted of Ni or Co, is very high, by providing the active material particle surface with an oxidation-resistant lithium transition metal oxide, the positive electrode active material can be prevented from being brought into direct contact with an electrolytic solution.

By providing the electrode surface of a positive electrode with an overcoat layer constituted of a metal oxide and covering the active material particle surface with a metal oxide, the effect is exerted at a higher level.

A method of covering the active material particle surface with a metal oxide is not particularly restricted and a conventionally performed method such as an immersion method in which a prescribed amount of a coating liquid containing a metal oxide is added with a prescribed amount of active material powder to be mixed therewith can be used. Examples of a more convenient method include a method of spraying metal oxide microparticles onto active material particles with the use of a sprayer. According to this method, the active material particle surface can be suitably covered with a metal oxide. A coating method by a sprayer can be easily performed and is also advantageous from an aspect of cost. The same method can be used also in the case where an electrode surface is coated with a metal oxide.

In the case where the electrode surface of a positive electrode is provided with an overcoat layer constituted of a metal oxide, it is preferred that the thickness of the overcoat layer constituted of a metal oxide on the electrode surface be 0.1 to 10 μm or so. When the thickness is less than 0.1 μm, there is a case where lowering in capacity of the positive electrode active material and oxidative decomposition of the water-based binder at the time of charging fail to be sufficiently prevented. Moreover, when the thickness is more than 10 μm, the electrode thickness is increased and there is a tendency that a battery deteriorates in the high-rate discharge characteristics since it is necessary for the impedance of the battery to be enhanced as well as being made low in capacity.

A positive electrode active material can be provided with a mixture of a metal oxide and a conductive additive on its particle surface. In this case, for example, a method of previously providing the particle surface with a mixture of a metal oxide and a carbon precursor and carbonizing the carbon precursor by a heating treatment method may be adopted. In this connection, the heating treatment method refers to a method of subjecting a carbon precursor to a heating treatment at 600 to 4,000° C. or so in a non-oxidizing atmosphere (hardly oxidizable condition such as a reducing atmosphere, an inert atmosphere, and a pressure-reduced atmosphere) to carbonize the carbon precursor and making the resulting carbon material exhibit its conductivity.

The carbon precursor is not particularly restricted as long as the precursor can be formed into a carbon material by a heating treatment and examples thereof include glucose, citric acid, pitch, tar, binder materials used for electrodes, and the like.

In the case where the total of the metal oxide and the carbon precursor is defined as 100% by mass, it is preferred that the proportion of the carbon precursor be 0.5 to 20% by mass or so. When the proportion of the carbon precursor is less than 0.5% by mass, there is a case where the conductivity of a positive electrode fails to be sufficiently enhanced. Moreover, when the proportion of the carbon precursor is more than 20% by mass, there is a tendency that a possibility of causing aggregation of the positive electrode active material is increased because carbon repels water and becomes difficult to be uniformly dispersed at the time of preparing water-based slurry. In the case where the positive electrode active material is so-called carbon-coated powder or a carbon-based conductive additive is used as the positive electrode active material, a possibility of causing aggregation of the positive electrode active material is increased because carbon repels water and the positive electrode active material becomes difficult to be uniformly dispersed in water-based slurry at the time of preparing the slurry. In that case, it is preferred that a surfactant be added to the slurry. A saponin, a phospholipid, a peptide, Triton, and the like are effective as a surfactant and the surfactant in an amount of 0.01 to 0.1% by mass or so relative to the whole slurry needs only to be added thereto.

<Battery>

The positive electrode for lithium ion secondary batteries of the present invention can be used to prepare the lithium ion secondary battery of the present invention.

As a negative electrode, materials usually used for lithium ion secondary batteries can be used. For example, the material needs only to be constituted of at least one or more kinds of element selected from the group consisting of Li, Na, C, Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi, an alloy composed of these elements, an oxide composed thereof, a chalcogenide composed thereof, or a halide composed thereof.

Of these, from the viewpoint that a discharge plateau region can be observed within the range of 0 to 1 V (against the lithium potential), preferred is at least one or more kinds of element selected from the group consisting of Li, C, Mg, Al, Si, Ti, Zn, Ge, Ag, Cu, In, Sn, and Pb, an alloy composed of these elements, or an oxide composed thereof. Furthermore, from the viewpoint of the energy density, Al, Si, Zn, Ge, Ag, Sn, or the like is preferred as the element, the respective combinations of Si—Al, Al—Zn, Si—Mg, Al—Ge, Si—Ge, Si—Ag, Zn—Sn, Ge—Ag, Ge—Sn, Ge—Sb, Ag—Sn, Ag—Ge, Sn—Sb, and the like, and the like are preferred as the alloy, SiO, SnO, $SnO_2$, CuO, $Li_4Ti_5O_{12}$ or the like is preferred as the oxide.

Among these, it is more preferred that Si-based materials be used, since the high-rate discharge characteristics, as well as the energy density, can be enhanced. However, in many types of Si-based materials, the cycle characteristics thereof are not sufficiently exerted because the Si-based material varies greatly in its volume due to charging and discharging. On that account, it is preferred that SiO, which is decomposed, in an initial charging process, into two components of a solid electrolyte having a lithium ion conductivity and a material capable of reversibly occluding/releasing lithium, be used.

In this connection, it does not matter at all if two or more kinds of these materials capable of reversibly occluding/releasing lithium are used.

Moreover, a lithium salt is preferred as an electrolyte salt because it is necessary for a lithium ion secondary battery prepared with the positive electrode of the present invention to contain lithium ions. Although the lithium salt is not particularly restricted, specific examples thereof include lithium hexafluorophosphate, lithium perchlorate, lithium tetrafluoroborate, trifluoromethane sulfonic acid imide lithium, and the like. One kind of these lithium salts may be used alone or two or more kinds thereof may be mixedly used. Since the above-mentioned lithium salts are high in electronegativity and easily ionized, a secondary battery can be made excellent in charge-discharge cycle characteristics and the charge-discharge capacity of the secondary battery can be enhanced.

As a solvent for the electrolyte, for example, propylene carbonate, ethylene carbonate, dimethyl carbonate, diethyl carbonate, γ-butyrolactone, and the like can be used, and one kind of these solvents may be used alone or two or more kinds thereof may be mixedly used. In particular, propylene carbonate as a simple substance, a mixture of ethylene carbonate and diethyl carbonate, or γ-butyrolactone as a simple substance is suitable. In this connection, the mixing ratio of ethylene carbonate and diethyl carbonate in the mixture can be arbitrarily adjusted within a range where the amount of one component is 10% by volume or more and 90% by volume or less.

Moreover, the electrolyte for the lithium ion secondary battery of the present invention may be a solid electrolyte or an ionic liquid. According to the lithium ion secondary battery of the above-described structure, a lithium ion secondary battery can be made to function as a lithium ion secondary battery excellent in high-rate discharge characteristics.

Although the structure of the lithium ion secondary battery is not particularly limited, the present invention can be applied to an existing battery form/structure of a battery such as a laminated battery or a wound battery.

<Electrical Equipment>

Since a lithium ion secondary battery provided with the positive electrode of the present invention is satisfactory in safety, the battery can be utilized as a power source for various kinds of electrical equipment (including a vehicle that uses electricity).

Examples of the electrical equipment include an air-conditioner, a washing machine, a television receiver, a refrigerator, a freezer, cooling equipment, a notebook personal computer, a tablet computer, a smartphone, a personal computer keyboard, a display for a personal computer, a desktop type personal computer, a CRT monitor, a printer, an all-in-one personal computer, a mouse, a hard disk, personal computer peripheral equipment, an iron, a clothes dryer, a window fan, a transceiver, an air blower, a ventilating fan, a television receiver, a music recorder, a music player, an oven, a kitchen range, a toilet seat with a washing function, a warm air heater, a car compo, car navigation equipment, a flashlight, a humidifier, portable Karaoke equipment, a ventilating fan, a dryer, an air cleaner, a cellular phone, an emergency light, a game machine, a sphygmomanometer, a coffee mill, a coffee maker, a kotatsu heater, a copying machine, a disk changer, a radio, a shaver, a juicer, a shredder, a water purifier, a lighting apparatus, a dehumidifier, a dish dryer, a rice cooker, a stereophonic apparatus, a stove, a speaker, a trouser press, a vacuum cleaner, a body fat meter, a body weight meter, a bathroom scale, a movie player, an electrically heated carpet, an electric rice cooker, a desk lamp, an electric pot, an electronic game machine, a portable game machine, an electronic dictionary, an electronic organizer, a microwave oven, an electromagnetic cooker, an electronic calculator, an electric cart, an electric wheelchair, an electric power tool, an electric toothbrush, an electric foot warmer, electric hair clippers, a desk-telephone, a clock, an intercom, an air circulator, an electric bug killer, a hot plate, a toaster, a dryer, an electric drill, a water heater, a panel heater, a crusher, a soldering iron, a video camera, a video cassette recorder, facsimile equipment, a food processor, a futon dryer, a headphone, a microphone, a massage machine, a sewing machine, a rice-cake making machine, a floor heating panel, a lantern, a remote controller, a refrigerating/warming cabinet, a water cooler, a cold air blower, a word processor, an electric whisk, electronic musical instruments, a motorbike, electric toys, a lawn mower, an electric float, an electric bicycle, an automobile, a hybrid vehicle, a plug-in hybrid vehicle, an electric vehicle, a railway vehicle, a ship, an airplane, a storage battery for emergency, and the like.

EXAMPLES

Hereinafter, the present invention will be described in more detail by reference to examples, but the present invention should not be limited by these examples at all.

<Preparation of Binder>

Example 1

Into a 500-mL four-necked flask equipped with a stirrer, a thermometer, a nitrogen inlet tube, and a condenser, 45 g (0.625 moles) of acrylic acid, 0.45 g of BLEMMER VMA70 (available from NOF CORPORATION, a mixture of 10 to 20 parts by mass of stearyl methacrylate, 10 to 20 parts by mass of eicosanyl methacrylate, 59 to 80 parts by mass of behenyl methacrylate, and 1 part by mass or less of tetracosanyl methacrylate) as a (meth)acrylic acid alkyl ester having an alkyl group with 18 to 24 carbon atoms, 150 g of normal hexane, and 0.081 g (0.00035 moles) of 2,2'-azobis-methylisobutylate were placed. Then, the contents were stirred and uniformly mixed, after which nitrogen gas was blown into the solution in order to remove oxygen existing in the upper space of the reaction vessel, in the raw materials, and in the solvent. Then, under a nitrogen atmosphere, the contents were made to undergo a reaction for 4 hours while maintaining the temperature at 60 to 65° C. After the completion of the reaction, the contents were cooled and subjected to centrifugal filtration to remove the filtrate. To a polymer obtained by removing the filtrate, 100 g of normal hexane was added, the contents were stirred and subjected to centrifugal filtration, and the filtrate was removed to wash the polymer. The obtained polymer was heated to 90° C., the remaining normal hexane was distilled off, and furthermore, the contents were dried under reduced pressure for 8 hours at 110° C. and 10 mmHg to obtain 43 g of a finely powdered white alkyl-modified carboxyl group-containing interpolymer (a). The obtained alkyl-modified carboxyl group-containing interpolymer (a) was evaluated for the amount of the remaining initiator in the following manner. Results are shown in Table 1.

The amount of the remaining initiator was measured by gas chromatography (Column: capillary column Rtx-200, 30 m in length×0.53 mm in inner diameter, available from SHIMADZU CORPORATION, Column temperature: 160° C., Detector: FID).

Comparative Example 1

Into a 500-mL four-necked flask equipped with a stirrer, a thermometer, a nitrogen inlet tube, and a condenser, 45 g (0.625 moles) of acrylic acid, 0.45 g of BLEMMER VMA70 (available from NOF CORPORATION, a mixture of 10 to 20 parts by mass of stearyl methacrylate, 10 to 20 parts by mass of eicosanyl methacrylate, 59 to 80 parts by mass of behenyl methacrylate, and 1 part by mass or less of tetracosanyl methacrylate) as a (meth)acrylic acid alkyl ester having an alkyl group with 18 to 24 carbon atoms, 150 g of normal hexane, and 0.081 g (0.00035 moles) of 2,2'-azobis-methylisobutylate as an initiator were placed. Then, the contents were stirred and uniformly mixed, after which nitrogen gas was blown into the solution in order to remove oxygen existing in the upper space of the reaction vessel, in the raw materials, and in the solvent. Then, under a nitrogen atmosphere, the contents were made to undergo a reaction for 4 hours while maintaining the temperature at 60 to 65° C. After the completion of the reaction, the slurry produced was heated to 70° C. and the normal hexane was distilled off to obtain 42 g of a finely powdered white alkyl-modified carboxyl group-containing interpolymer (b). The obtained alkyl-modified carboxyl group-containing interpolymer (b) was evaluated for the amount of the remaining initiator in the same manner as that in Example 1. Results are shown in Table 1.

TABLE 1

| | Binder | Remaining Amount of Initiator (ppm) |
|---|---|---|
| Example 1 | Interpolymer (a) | 200 |
| Comparative Example 1 | Interpolymer (b) | 1000 |

<Preparation of LiFePO$_4$ Positive Electrode>

Example 2

In water, 1 g of the alkyl-modified carboxyl group-containing interpolymer (a) obtained in Example 1 was dissolved and the pH of the solution was adjusted to 6 to 8 with a 6% by mass aqueous sodium hydroxide solution to prepare a 10% by mass aqueous binder solution. To a mixture of 60 parts by mass of the obtained aqueous binder solution, 90 parts by mass of lithium iron phosphate as a positive electrode active material, 2 parts by mass of carbon nanotubes as a conductive additive, and 2 parts by mass of Ketjen black, water was added and the contents were stirred to prepare a slurried positive electrode mixture with a solid content concentration of 40% by mass. The mixture was applied onto a sheet of aluminum foil with a thickness of 20 μm and dried, after which, by the use of a roll press machine (available from Oono-roll Corporation), the aluminum foil and the coating film were tightly bonded together and then subjected to a heating treatment (under reduced pressure, 180° C., 3 hours or more) to prepare a positive electrode for testing. The composition of the positive electrode for testing was shown in Table 2. The positive electrode capacity density of the positive electrode for testing was set to 0.7 mAh/cm$^2$ (average thickness of active material layer: 35 μm).

Comparative Example 2

A positive electrode for comparison was prepared to be evaluated in the same manner as that in Example 2 except that an alkyl-modified carboxyl group-containing interpolymer (b) was used instead of the alkyl-modified carboxyl group-containing interpolymer (a) in Example 2. The composition of the positive electrode for comparison was shown in Table 2.

TABLE 2

| | Active Material A | Binder B | Conductive Additive C | Conductive Additive D | Composition Ratio of Positive Electrode (% by mass) A:B:C:D |
|---|---|---|---|---|---|
| Example 2 | LFP | Interpolymer (a) | CNT | KB | 90:6:2:2 |
| Comparative Example 2 | LFP | Interpolymer (b) | CNT | KB | 90:6:2:2 |

In Table 2, LFP means lithium iron phosphate, CNT means a carbon nanotube, and KB means Ketjen black.

Assembly of Battery

Example 3

A coin cell (CR2032) which is provided with a positive electrode for testing obtained in Example 2; a counter electrode constituted of metallic lithium; a glass filter (GA-100 available from Advantec Toyo Kaisha, Ltd.) as a separator; and a solution, as an electrolytic solution, prepared by dissolving LiPF$_6$ in a concentration of 1 mol/L in a solvent prepared by mixing ethylene carbonate (EC) and diethyl carbonate (DEC) at a volume ratio of 1:1 and by being added with 1% by mass of vinylene carbonate (VC) as an additive for electrolyte, was prepared to be subjected to an aging treatment in which a cycle test is performed two times at 0.2 C under an environment of 30° C.

High-Rate Discharge Test

With regard to a coin cell of Example 3, a high-rate discharge test was performed under an environment of 30° C. With regard to the condition of the high-rate discharge test, the coin cell was charged at 0.5 C and discharging was performed at each of the respective rates of 0.5 C, 1 C, 3 C, 5 C, 10 C, and 30 C. In this connection, the cut-off potential was set to 4.2-2.0 V (vs. Li$^+$/Li). Active material capacities at the respective discharge rates obtained as the result of the high-rate discharge test are shown in Table 3. Average potentials (V vs. Li⁺/Li) at the respective discharge rates obtained as the result of the high-rate discharge test are shown in Table 4. In the case where the active material capacity is 0 mAh/g, a value of the average potential is shown as "—" because the average potential during discharging fails to be measured.

Comparative Example 3

A battery was assembled in the same manner as that in Example 3 except that a positive electrode for comparison obtained in Comparative Example 2 was used and a high-rate discharge test was carried out. Results are shown in Tables 3 and 4.

TABLE 3

| Example | Active Material Capacities at Respective Discharge Rates (mAh/g) | | | | | | |
|---|---|---|---|---|---|---|---|
|  | 0.2 C. | 0.5 C. | 1 C. | 3 C. | 5 C. | 10 C. | 30 C. |
| Example 2 | 166 | 163 | 162 | 154 | 148 | 133 | 52 |
| Comparative Example 2 | 158 | 142 | 126 | 56 | 15 | 0 | 0 |

TABLE 4

| Example | Average Potentials during Discharging at Respective Discharge Rates (V) | | | | | | |
|---|---|---|---|---|---|---|---|
|  | 0.2 C. | 0.5 C. | 1 C. | 3 C. | 5 C. | 10 C. | 30 C. |
| Example 2 | 3.35 | 3.33 | 3.32 | 3.25 | 3.2 | 3.07 | 2.87 |
| Comparative Example 2 | 3.35 | 3.33 | 3.30 | 2.95 | 2.73 | — | — |

In general, a battery shows a tendency that the internal resistance becomes larger as the rate is made higher and the active material capacity and the average potential are decreased, but as shown in Table 3 and Table 4, it has become apparent that, in the case of using the positive electrode of Example 2, high discharge capacity and high discharge potential are attained even at a high rate of 30 C.

The invention claimed is:

1. A binder for lithium ion secondary battery positive electrodes, comprising: a binder resin; and an oil-soluble radical initiator in a concentration of 500 ppm or less, wherein the binder resin comprises an alkyl-modified carboxyl group-containing interpolymer prepared by copolymerizing a (meth)acrylic acid alkyl ester having an alkyl group with 18 to 24 carbon atoms in a proportion of 0.1 to 10 parts by mass with 100 parts by mass of (meth)acrylic acid.

2. The binder for lithium ion secondary battery positive electrodes according to claim 1, wherein the oil-soluble radical initiator is at least one kind selected from the group consisting of an organic peroxide, an azo compound, and a redox initiator.

3. The binder for lithium ion secondary battery positive electrodes according to claim 1, wherein the binder resin is a suspension polymer, an emulsion polymer, a dispersion polymer, or a precipitation polymer constituted of monomer units.

4. A positive electrode for lithium ion secondary batteries, comprising: an active material; a conductive additive; and the binder for lithium ion secondary battery positive electrodes according to claim 1.

5. The positive electrode for lithium ion secondary batteries according to claim 4, wherein the binder in an amount of 0.5 to 30% by mass relative to the total mass of the active material, the conductive additive, and the binder is included.

6. A lithium ion secondary battery, being provided with the positive electrode for lithium ion secondary batteries according to claim 4.

7. Electrical equipment, being mounted with the lithium ion secondary battery according to claim 6.

8. A method of binding an active material and a conductive additive to a current collector, the method comprising applying to the current collector the binder according to claim 1, the active material and the conductive additive, wherein the method produces a lithium ion secondary battery positive electrode.

9. A method of producing a binder for lithium ion secondary battery positive electrodes, comprising the step of mixing a binder resin comprising an alkyl-modified carboxyl group-containing interpolymer prepared by copolymerizing a (meth)acrylic acid alkyl ester having an alkyl group with 18 to 24 carbon atoms in a proportion of 0.1 to 10 parts by mass with 100 parts by mass of (meth)acrylic acid and an oil-soluble radical initiator in a concentration of 500 ppm or less.

* * * * *